(12) United States Patent
Wangenheim (10) Patent No.: US 8,506,865 B2
(45) Date of Patent: Aug. 13, 2013

(54) COMPOSITE FABRIC PRODUCT AND PRODUCTION PROCESS THEREFOR

(75) Inventor: Keren Elen Wangenheim, Tel Aviv (IL)

(73) Assignee: Texoplast Ltd., Hod Hasharon (IL)

(*) Notice: Subject to any disclaimer, the term of this patent is extended or adjusted under 35 U.S.C. 154(b) by 623 days.

(21) Appl. No.: 12/664,890

(22) PCT Filed: Jun. 23, 2008

(86) PCT No.: PCT/IL2008/000851
§ 371 (c)(1),
(2), (4) Date: Dec. 16, 2009

(87) PCT Pub. No.: WO2009/001341
PCT Pub. Date: Dec. 31, 2008

(65) Prior Publication Data
US 2010/0183836 A1 Jul. 22, 2010

(30) Foreign Application Priority Data
Jun. 28, 2007 (IL) .......................... 184285

(51) Int. Cl.
*B29C 70/44* (2006.01)
(52) U.S. Cl.
USPC ........... 264/258; 264/103; 264/257; 156/148; 156/308.2; 156/309.6
(58) Field of Classification Search
USPC .............. 264/103, 257, 258; 156/148, 308.2, 156/309.6
See application file for complete search history.

(56) References Cited

U.S. PATENT DOCUMENTS

| | | | |
|---|---|---|---|
| 4,842,915 A | 6/1989 | Hartmann et al. | |
| 5,055,242 A * | 10/1991 | Vane | 264/463 |
| 5,175,034 A | 12/1992 | Andre de la Porte et al. | |
| 5,205,635 A * | 4/1993 | Van Order et al. | 362/492 |
| 5,234,551 A | 8/1993 | Dutt et al. | |
| 5,490,602 A * | 2/1996 | Wilson et al. | 216/56 |
| 5,888,616 A | 3/1999 | Ang | |
| 5,976,295 A * | 11/1999 | Ang | 156/219 |
| 6,612,637 B1 * | 9/2003 | Crotty, III | 296/97.11 |
| 7,255,761 B2 * | 8/2007 | Zafiroglu | 156/85 |
| 2004/0066056 A1 * | 4/2004 | Mills et al. | 296/97.1 |
| 2007/0160799 A1 * | 7/2007 | Nguyen | 428/74 |

FOREIGN PATENT DOCUMENTS

| | | |
|---|---|---|
| DE | 9013194 | 11/1990 |
| DE | 202004007400 | 8/2004 |
| EP | 0893244 | 1/1999 |

OTHER PUBLICATIONS

International Preliminary Report on Patentability for corresponding international application, 8 pages, mailed Oct. 1, 2009.

* cited by examiner

*Primary Examiner* — Joseph S Del Sole
*Assistant Examiner* — David N Brown, II
(74) *Attorney, Agent, or Firm* — Roach Brown McCarthy & Gruber, P.C.; Kevin D. McCarthy (57) ABSTRACT

A composite fabric product comprises at least one layer of textile material and at least one layer of melted plastic material, wherein non-melting textile material is embedded in at least one of the said layers of melted plastic material, and wherein filaments or yarns located in at least one of said layers of textile material extend into said at least one layer of melted plastic material and interlace with the non-melting textile material embedded therein.

14 Claims, 6 Drawing Sheets

COMPOSITE FABRIC PRODUCT AND PRODUCTION PROCESS THEREFOR

REFERENCE TO CO-PENDING APPLICATIONS

Priority is claimed from a 371 of international of PCT/IL2008/000851, filed on Jun. 23, 2008, which claims priority to Israeli patent application number 184285, filed on Jun. 28, 2007.

FIELD OF THE INVENTION

The present invention relates to the field of textile products. More particularly, the invention relates to a composite fabric product comprising an integrated multi-layer fabric, woven or knitted with a combination of yarns/fibers and a process for producing the same.

BACKGROUND OF THE INVENTION

Composite fabric products are of great utility for those applications that require on one hand the softness and texture of a textile fabric product and on the other hand have stiffness, form, rigidity and other properties of a composite material, like relatively high load bearing capacity and toughness. However, prior art composite fabrics suffer from many different severe drawbacks, for instance, due to the lack of bonding strength between the textile and the hard surface. In many cases there is a need for special surface preparation and the use of a bonding agent. The term "composite fabric product", as used herein and as more fully discussed hereinafter, relates to products comprising a combination of non-melting textile material (which can be thermoplastic) and of melted plastic material, typically thermoplastic material.

For example, EP 0893244 discloses a carpet comprising a primary backing fabric into which face yarn is tufted, and a modified secondary backing fabric attached to the primary backing fabric. The modified secondary backing fabric comprises a secondary backing scrim fabric and a fiber batt integrated as a unitary scrim, which is rigid and has a soft face opposite the face presented by the scrim fabric. The modified fabric is subjected to heat sufficient to remove all loose fibers projecting from the soft face.

U.S. Pat. No. 5,888,616 discloses a recyclable vehicle interior component having a substantially rigid core and formed by molding the following three layers of different materials from one polymer family into a shaped component: a polyester (PET) fabric, a layer of bi-component polyester padding that is an intermixed blend of low temperature melting point fibers for bonding and higher temperature melting point fibers for imparting resiliency and a soft feel, and a core layer of polyester/glass fiber for rigidity and self support. Although such a component has a relatively high compressive strength, it has a relatively weak tensile strength when pulled, often resulting in the delaminating of the core layer from one of the other layers.

It is an object of the present invention to provide a composite fabric product that overcomes the drawbacks of prior art products and which presents improved structural characteristics.

It is another object of the present invention to provide a cost-effective process for producing a composite fabric product.

Other objects and advantages of the invention will become apparent as the description proceeds.

SUMMARY OF THE INVENTION

In one aspect the invention is directed to a composite fabric product comprising at least one layer of textile material and at least one layer of melted plastic material, wherein non-melting textile material is embedded in at least one of the said layers of melted plastic material, and wherein filaments or yarns located in at least one of said layers of textile material extend into said at least one layer of melted plastic material and interlace with the non-melting textile material embedded therein.

The product may further comprise a dampening and isolation layer of textile material, and filaments or yarns located in at least one of said layers of textile material extend and interlace to with said at least one isolation layer of textile material and filaments or yarns located in at least one of said isolation layers of textile material may extend into said at least one layer of melted plastic material and may interlace with the non-melting textile material embedded therein thereby allowing the isolation layer to expand.

The composite fabric product of the invention can be produced using filaments or yarns made from a variety of materials. Illustrative examples of such materials comprise polyethylene fibers, polypropylene fibers, polyester fibers, polyamide fibers, aramid fibers, Glass fibers, Carbon fibers, Acrylic fibers and natural fiber. Any type and combination of materials can be used as long as at least one is a melting thermoplastic material and at least one does not melt or significantly deteriorate during the heating step.

The invention also allows manufacturing a composite fabric product wherein different regions of the fabric have a different number of layers. Furthermore, the composite fabric product of the invention may have a three-dimensional spatial shape, such as, for instance, a curvilinear or rectilinear shape, and it can further be shaped as an open or a closed loop.

The composite fabric product of the invention can be used in very many applications and is not limited to any particular use. An illustrative use, which is of particular interest, is the manufacturing of a vehicle interior component, such as headliners, sun visors or door panels. Other illustrative examples include chairs, lounge chairs, wall coverings, ceilings, partitions, acoustical screens, cases, fashion accessories and structural accessories.

In another aspect the invention is directed to a method for manufacturing a composite fabric product, comprising the steps of
 a. Providing at least one outer layer of textile material which does not melt at the manufacturing temperature.
 b. Providing at least one layer of thermoplastic textile material which melts at the manufacturing temperature and which incorporates at least one type of yarn or filament of textile material that does not melt at the manufacturing temperature.
 c. Interlacing textile material from said outer layer at least at one location with textile material that does not melt at the manufacturing temperature, which is located in the layer of plastic textile material;
 d. Providing optionally an intermediate textile layer in between the textile upper layer and the plastic layer isolating the plastic from the textile;
 e. Interlacing textile material that does not melt from one adjacent layer to the other that does not melt at the manufacturing temperature;
 f. Heating the thermoplastic material layer to a temperature sufficient for at least partially causing it to melt; and
 g. Allowing the fabric to cool, thus thereby to create a solid matrix layer which contains reinforcing threads that interlace with threads originating from the outer textile layer is created.

In one embodiment of the invention the process further comprises the step of working the interlaced material of step (e) in applying/inserting fabric to a set of mold elements that have a predetermine gap, and controlling separately heating and cooling of said material separately, prior to performing the heating step.

According to the invention many open and closed structures can be produced. For instance, a trailing longitudinal end of the fabric can be made to overlap and be brought into contact with a leading longitudinal end thereof, prior to performing the heating step, or a right transversal side of the fabric can be made to overlap and be brought into contact with a left transversal side thereof, prior to performing the heating step.

As will be apparent to the skilled person, the process of the invention allows for great flexibility in the incorporation of additional constructive or functional elements into the composite fabric product. Thus, for instance, electricity and communication lines, or accessories such as hinges, can be incorporated in the composite plastic layer prior to the heating step.

DETAILED DESCRIPTION OF THE INVENTION

The present invention provides a composite fabric product that may have a hardened formed plastic on one side and the look, feel, and texture of a designed fabric on the other side, or also a hardened formed plastic sandwiched between two or more layers of textile material, the look, feel, and texture of a designed fabric being provided on both outer sides. A multi layer integrated fabric is woven or knitted with a selected combination of threads of any form and material, and include at least one layer that contain reinforcement threads and fibers/yarns made from thermoplastic material with a known melting temperature. The fabric is heated to the abovementioned melting temperature. The melted material creates a matrix that solidifies after cooling and form a hardened section that may be on the surface or inside the product. Apart from the thermoplastic material mentioned, all other fibers/yarns used for weaving the fabric should not significantly deteriorate when exposed to the above melting temperature.

Accordingly, a composite fabric product comprises at least one cloth side and a hardened portion, which are integrally woven or knitted and fused together.

As used herein, the term "fused" denotes the process whereby melted fibers become chemically or physically (e.g., by penetrating into the voids of a solid structure or into pores of another material) attached to other fibers or threads, whether in a liquid or solid phase, without the use of external means such as a bonding agent. Chemical additives to either fiber may be used, however, to increase the cohesion and fusing of the fibers.

As used herein, the term "fused" may also denote a situation whereby fibers or threads that did not melt, penetrate or interlace or become embedded in the matrix created by the melted fibers. After the matrix cools and solidifies, a portion of the fibers/threads that did not melt are physically held by the matrix. The remaining part of those fibers/threads is part of the external cloth, that makes the cloth and the hardened part physically attached. Fibers or threads originating from the external fabric are hooked with the reinforcement threads that lie inside the matrix and are part of the hardened portion. In that way the physical attachment between the external cloth and hardened part is suitable to achieve the desired result.

In one embodiment, one side of the composite product is a cloth side, and the other side is the hardened portion in which a large proportion of the fibers or yarns have melted.

In another embodiment, a cloth may be provided on both sides of the composite fabric product while the harden section lies between the two cloth sides. The cloth on either side may be identical or produced with different materials and may have different pattern and properties tailored according to the product end use.

The multi-layered woven fabric comprises at least one layer containing melting fibers/yarns and at least one layer containing non-melting fibers/yarns. The layer that contains the melting fibers/yarns includes non-melting fibers/yarns as reinforcement. At least one isolation layer woven or knitted with non-melting fibers/yarns may be woven or knitted between the above mentioned layers. In woven fabrics the layers are held together by either dropping or raising some of the warp or weft threads to the adjacent layer or to another layer which force the layers to interlace at that point, or, by using separate warp or weft threads to interconnect the layers. In knitted fabrics the layers are held together by looped and or tucked yarns in an adjacent layer or in another layer.

The term melting fibers/yarns [MFY] refer to fibers/yarns made from thermoplastic material that melts and creates a matrix when subjected to a temperature equal to or above their melting temperature. After a cooling process the matrix solidifies and hardens.

The term non-melting fibers/yarns [NMFY] refer to fibers/yarns that do not melt or significantly deteriorate when subjected to a temperature used to melt the MFY in the multi layer fabric. The NMFY may be any type of fiber natural or synthetic that does not significantly deteriorate when subjected to a temperature used to melt the MFY in the multi layer fabric. It should be noted that the term NMFY is used relatively to the MFY material in the multilayer fabric. In other words, the fibers or yarns that are considered NMFY when used with a specific MFY fiber or yarn, can melt at higher temperatures and can be used as MFY in a different multilayer fabric employing a non-melting or higher-melting NMFY.

The multi-layered fabric can be made from a variety of fibers. Illustrative examples of such fibers comprise polyethylene fibers, polypropylene fibers, polyester fibers, polyamide fibers, Aramid fibers, glass fibers, carbon fibers, acrylic fibers and natural fiber. Any type and combination of materials may be used as long as at least one meets the criteria of MFY and at least one meets the criteria of NMFY.

In some cases of material combinations the composite fabric product can be recycled and used as a raw material in the composite material industry.

The yarns that are used for weaving as warp and weft may have the form of tow and/or multi filament and/or mono filament and/or tape and/or spun and/or bi-component and/or commingled and/or plied.

According to one embodiment of the invention, different regions of the fabric have a different number of layers, in order to achieve a controlled level of the final product physical properties like form, stiffness, flexibility, rigidity and other.

The composite fabric product is configured into any desired three-dimensional configuration, for instance a curvilinear or rectilinear configuration, and may be a continuous product, e.g. without any longitudinal discontinuities, or may have two spaced longitudinal ends. For example, the composite fabric product may be a vehicle interior component such as headliners, sun visors or door panels. Other illustrative applications include a table, chair, cases, wall coverings, ceilings, partitions, acoustical screens, fashion accessories, as well as structural elements of any type.

In one embodiment, the process further comprises the step of applying the fabric into a predetermined gap between a set of mold elements prior to performing the heating step.

In another embodiment, a trailing longitudinal end of the fabric is brought to overlap and in contact with a leading longitudinal end thereof prior to performing the heating step. After heating and cooling process a composite fabric product which its leading and trailing ends are fused together is created. The final hardened product is a three dimensional closed loop with a shape according to the set of molds.

A composite fabric product wider than the multi layer fabric can be created by bringing the transversal end of two or more fabrics to overlap and in contact prior the heating step. After heating and cooling the fabrics harden and fuse together.

The heating and cooling process can be controlled independently on each side of the material (time and temperature) so as to achieve different desired qualities.

The pressure on the multi layer fabric during the heating and the cooling phase can also be adjusted according to the final product end use and its required properties.

The present invention relates to the production of composite fabric product utilizing multi layer integrated fabric. The various material layers are woven or knitted simultaneously and are joined together during the weaving or knitting process to create a unitary fabric. Regarding composite fabric product, the following are some advantages that woven fabrics have over knitted fabric: (i) A much higher area weight and higher fiber volume fraction. (ii) Less porosity, higher thread density and compaction (iii) The embedded reinforcing threads are in the warp and weft direction and are almost straight, therefore, they have higher contribution to the material strength, compared with "laid in" threads and the looped formation of the knitted threads.

For the majority of applications woven fabric are advantages compared to knitted fabric, however, for some applications of the composite fabric product, fabric production by knitting technology may be selected.

Figure 1:
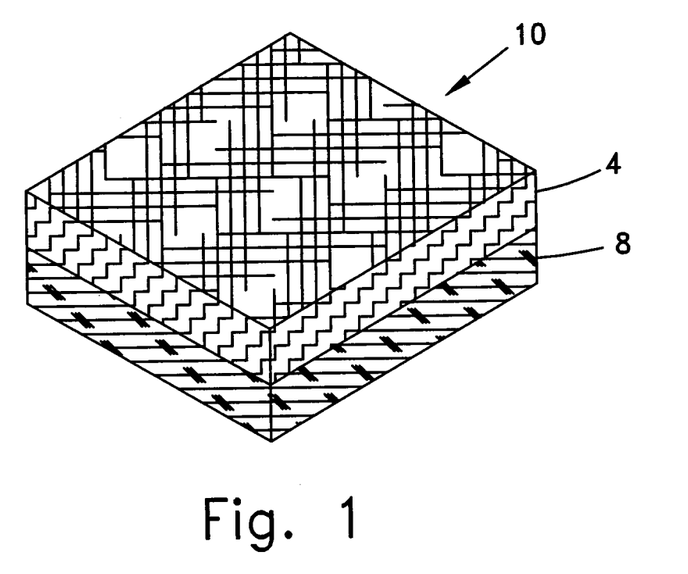
FIG. 1 is a schematic illustration in partially fragmented form of a composite fabric product, according to one embodiment of the present invention.

FIG. 1 schematically illustrates a composite fabric product, which is generally designated by numeral 10 and is shown in partially fragmented form. Composite fabric product 10 has two sides, a first cloth side 4 woven or knitted with NMFY and a second fused, hardened side 8 woven or knitted with MFY and NMFY which is integral with side 4. The cloth side 4 has the look, feel, and texture of a designed fabric, while hardened side 8 affords product 10 with high compressive and tensile strength. Product 10 is produced by a selected weave or knit pattern, which when heated on side 8 causes the MFY of side 8 to melt and to create a matrix and to be fused together with some interlaced threads originating from the cloth side 4, to form an integral composite fabric product.

Figure 2:
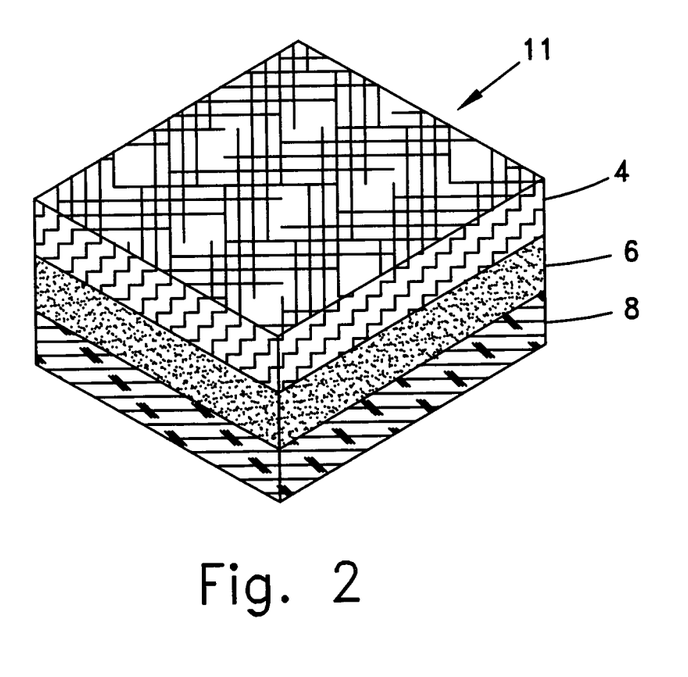
FIG. 2 is a schematic illustration in partially fragmented form of a composite fabric product with isolation layer, according to another embodiment of the present invention.

FIG. 2 schematically illustrates a composite fabric product, which is generally designated by numeral 11. An isolation layer 6 is integrally woven or knitted between the designed cloth layer 4 and the hardened layer 8 that were described above. Incorporating the isolation layer presents several advantages, such as increased durability and strength of the cloth layer, increased compressibility of the cloth layer serving as a damper, and the prevention of matrix leaching from the hardened layer to the cloth layer during the heating process. Layer 6 is attached to layers 4 and 8 on both of its borders, enabling layer 6 to expand according to design and process.

Any pattern well known to those skilled in the art to produce a multi-layered interlaced fabric may be employed. The yarns of the fabric interlace or knitted with many other neighboring yarns to produce a unitary fabric, which has a relatively high load bearing capacity. The load bearing capacity is further increased when the MFY melt and create a matrix that fuse the threads together.

Figure 3:
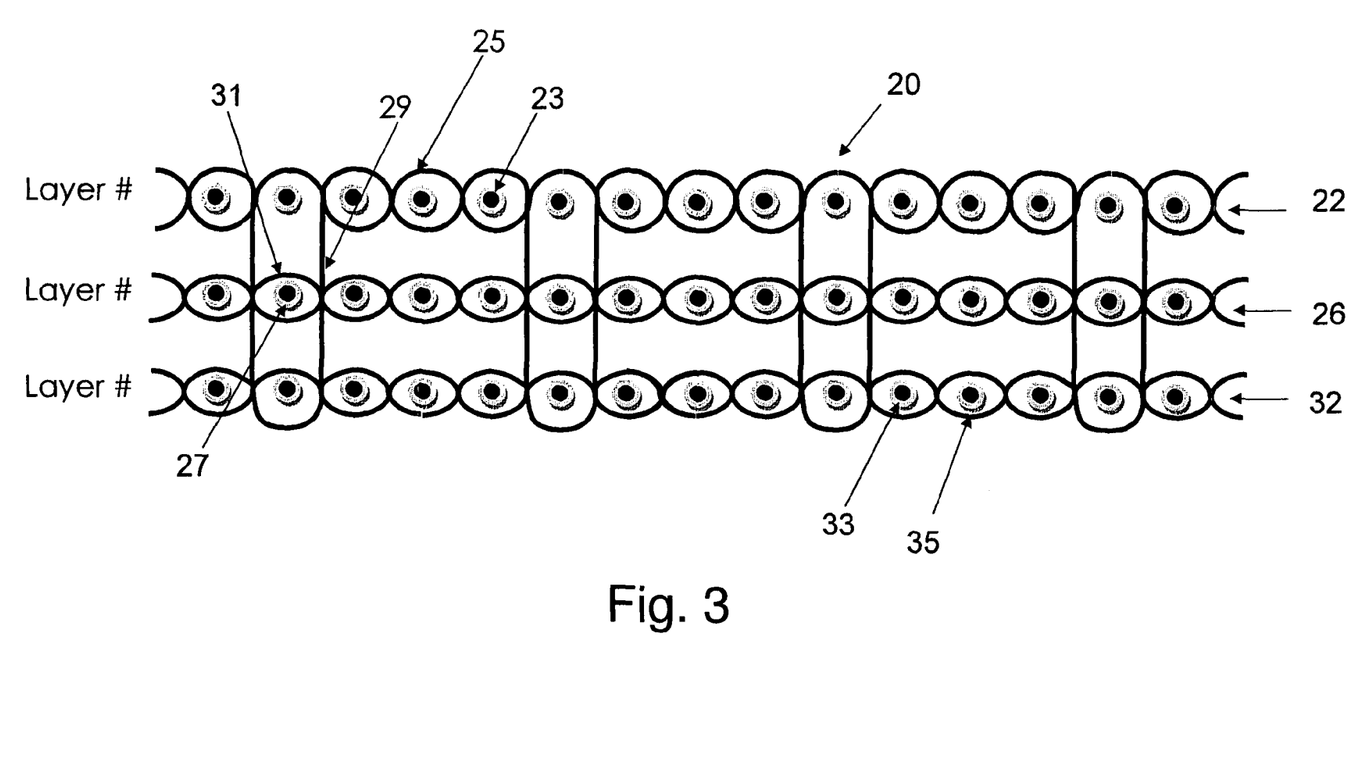
FIG. 3 is a side view of an exemplary weave pattern for producing a composite fabric product of the invention.

FIG. 3 illustrates a side view of an exemplary weave pattern for producing the composite fabric product of the invention. A multi-layered woven fabric designated generally by numeral 20 is shown, and includes a warp end 29 which is interlaced with all layers of woven fabric 20, for added fusibility and strength.

The layers of woven fabric 20 are woven simultaneously and are interlaced simultaneously, in order to increase the load bearing capacity of the composite fabric product. Woven fabric 20 of this specific illustrative and simple example comprises a first layer 22, serving as a design layer for providing the cloth side, a second layer 26 serving as an isolation layer, and a third layer 32 that include the MFY for providing a hardened side.

All of the warp yarns 25 and weft yarns 23 of cloth layer 22 are NMFY. Warp yarns 31 and weft yarns 27 of isolation layer 26 are NMFY. Warp yarns 35 and weft yarns 33 of layer 32 are MFY, or, NMFY, as long as MFY are included in layer 32. Using terms known to those skilled in the art, layer 32 and layer 26 and layer 32 are woven as plain weave 1×1. Any type of weave pattern can be selected for either layer. Warp thread 29 of the cloth layer 22 interlace at predetermine intervals with layer 32 and holds all three layers together as one multi layer fabric. Heating the fabric to the melting temperature of the MFY included in layer 32 creates a melted matrix that hardens and solidifies after cooling. Warp 29 is fused to the matrix and/or physically attached to the hardened layer. The attachment strength between the cloth layer and the hardened layer increases. Mixing NMFY in layer 32 with a proper interlacing path of yarn 29 will increase the attachment strength between cloth and hardened layer even further and improve the strength of the hardened layer 32 and the physical properties of the final product.

The following illustrative materials may be employed in this example. Cloth layer 22 is woven with polyamide yarns.

Isolation layer 26 is woven with polyester yarns and the hardened layer 32 is a mixture of polypropylene yarns and glass fiber tows. Polypropylene has a much lower melting temperature than all other material used. Therefore, after exposing the multi layer fabric to the melting temperature of the polypropylene and cooling the fabric, a composite fabric product is produced. Beside the polypropylene all other fibers are not affected by the heating and cooling process and maintain their original state. A product that has a hardened side and a soft cloth side, which are physically attached to each other, without the use of any bonding agent is created.

Figure 4:
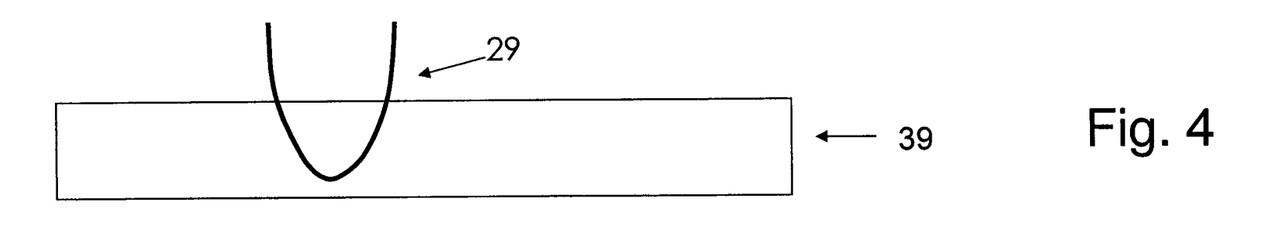
FIG. 4 is a side view of the matrix layer and exemplary interlaced thread.

Depending on the selected weave pattern and on the thread material sequence, there are various ways the cloth layer is attached to the hardened layer. FIG. 4 shows the situation of the hardened layer 39 after the heating and cooling process. In this illustration the hardened layer is woven with MFY as weft and NMFY as the warp. All MFY melt and the layer becomes a hardened matrix with reinforcing threads parallel to warp end 29 and therefore not shown in FIG. 4. Warp yarn 29 originating from the cloth layer in either of its ends is attached only to the matrix. The yarn that interlaced with warp end 29 during the weaving process melts and become part of the matrix. Increased attachment strength can be generated by mixing MFY and NMFY in the hardened layer.

Figure 5:
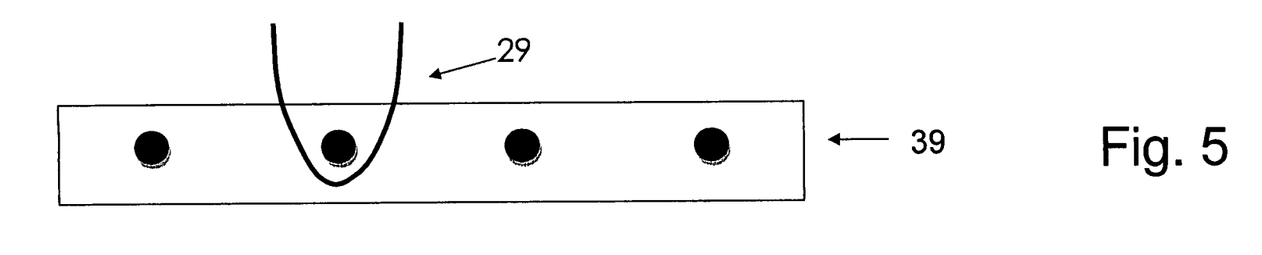
FIG. 5 is a side view of the matrix layer with embedded reinforcement thread and exemplary interlaced thread, according to one embodiment of the present invention.

FIG. 5 illustrates the situation in the hardened layer 39 after heating and cooling. Warp thread 29 was made to interlace with a NMFY that was not affected by the heating process. Therefore, warp thread 29 originating from the cloth on its either ends is anchored by the NMFY which are fully embedded in the matrix and also held by the matrix created by the melting of the MFY. Even higher attachment strength can be generated by mixing MFY and NMFY in the hardened layer.

Figure 6:
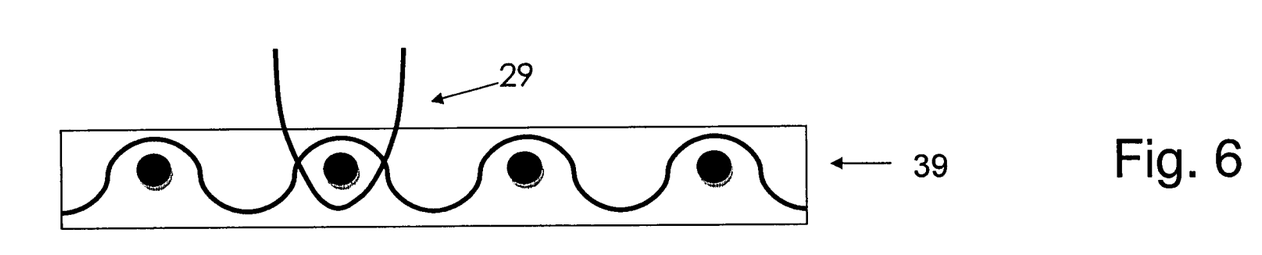
FIG. 6 is a side view of the matrix layer with embedded reinforcement net fabric and exemplary interlaced thread, according to another embodiment of the present invention.

FIG. 6 illustrates the situation in the hardened layer 39, after heating and cooling. Warp thread 29 was made to interlace with a NMFY with close proximity to a perpendicular NMFY that are not affected by the heating process. Therefore, warp thread 29 originating from the cloth on its either ends is anchored by a NMFY that is supported by a perpendicular NMFY. The two mentioned NMFY are fully embedded in the matrix created by the melting of the MFY. The matrix itself also holds warp thread 29.

It will be appreciated that threads from the cloth layer can interlace with the isolation layer and threads from the isolation layer can be made to interlace with the hardened layer in a similar ways to what is described above. When a plurality of layers is provided, threads from different layers can be made to interlace among one another.

It will also be appreciated that any desired method of interlacing threads originating from one layer to an adjacent layer, or to any particular layer.

It will further be appreciated that each layer can be woven by any desired weave pattern. Also, any other desired number of layers that include MFY may be employed, for added strength, while the plurality of layers will be heated for a correspondingly increased duration to ensure a complete melting and optimal fusing. Similarly, different regions of the woven fabric may have a different number of layers to achieve a controlled level of flexibility or rigidity.

In one embodiment, a composite fabric product may have double-sided design layers, to provide an improved aesthetic appearance. In this embodiment, the layers that contain the MFY are disposed internally to the two opposed, externally disposed cloth layers, and an isolation layer is interposed between each cloth layer and an adjacent hardened layer on either side of the product.

Figure 7:
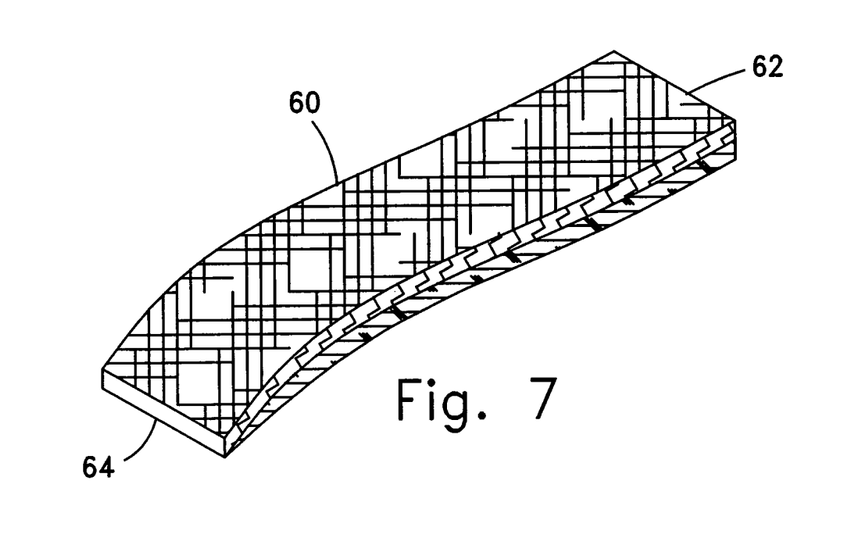
FIG. 7 is a schematic illustration of a multi layer fabric emphasizing the leading end and trailing end, according to one embodiment of the present invention.
Figure 8:
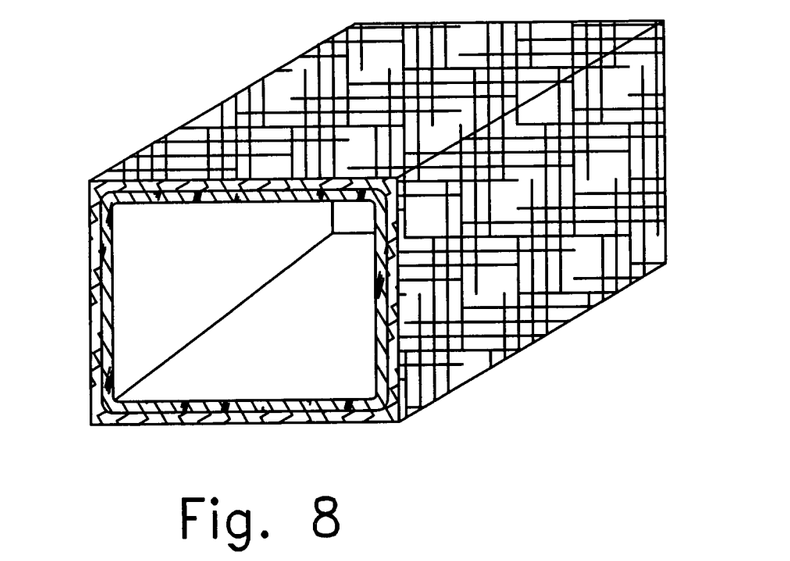
FIG. 8 is a schematic illustration of rectangular shape composite fabric product, according to one embodiment of the present invention.

FIG. 7 illustrates a multi layer fabric 60 according to the method described above, and its leading end 62 and trailing end 64. During the insertion into a set of molds and prior to the heating step, the leading end and the trailing end are brought into contact and overlap each other. After the heating and cooling steps, a continuous three-dimensional closed loop hardened fabric product is created and the fabric leading and trailing end are fused together. An exemplary product is illustrated in FIG. 8. The product shape depends on the shape of the set of molds used.

The duration of the heating process depends on the quantity of the MFY and the thickness of the layer(s) containing those fibers. Attention should be paid that essentially all the MFY should preferably melt to create a uniform matrix.

Figure 9:
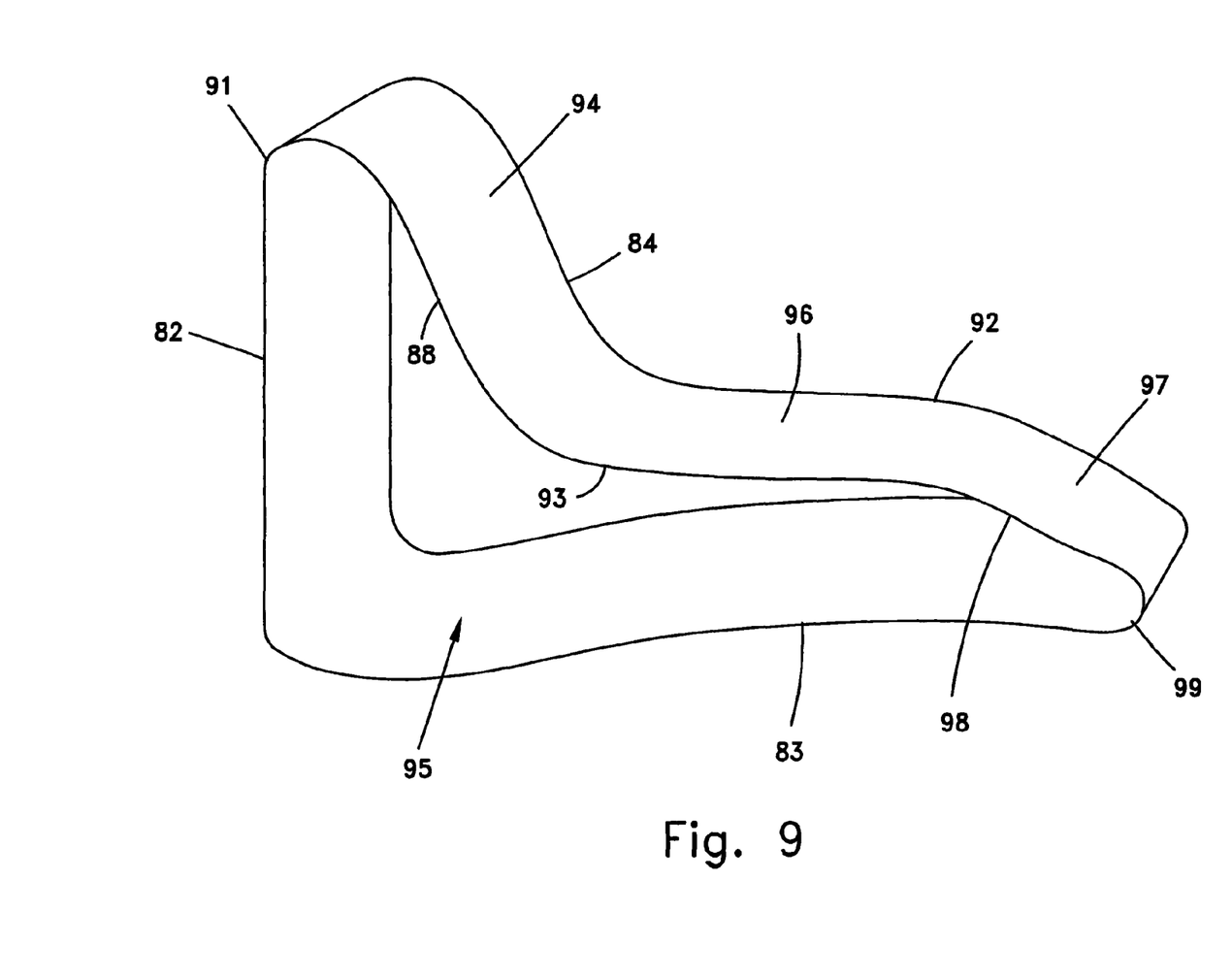
FIG. 9 is a perspective view of an exemplary composite fabric product.

FIG. 9 illustrates a composite fabric product embodied by a curvilinear mono-block lounge chair 92. A woven fabric is subjected to a unique process, as will be described hereinafter, which provides the woven fabric with a desired three-dimensional shape. As shown, the two longitudinal ends of the woven fabric are fused together to form a continuous product having vertical and horizontal support elements 82 and 83, body supporting surfaces 84 contiguous with support elements 82 and 83, and a hollow interior 95. As shown, the inner face, i.e. the face of the composite fabric product facing a user who lies thereon, of the body supporting surfaces of lounge chair 92 including back 94, seat 96, and leg rest 97, is the cloth side 84, while the inner face thereof is the hardened side 88. Back 94 is contiguous with vertical support element 82 via an arc portion 91 interposed therebetween to reduce the stress at that location, and leg rest 97 is contiguous with horizontal support element 83 via arc portion 99 interposed there between. Back 94 is contiguous with seat 96 via arc portion 93, and seat 96 is contiguous with leg rest 97 via arc portion 98. Thus the user can benefit from the high load capacity of the composite fabric product by being able to confidently lie on lounge chair 92 without falling and from the elegant appearance of a designed fabric.

The composite fabric product can be designed so that the hardened side 88 varies in hardness, for example by producing a softer portion in the center of a body-supporting surface, which corresponds to the anthropometry of the human body, while a more rigid portion is produced at the periphery of the body-supporting surface.

Each of the support elements and body supporting surfaces, or a portion thereof, may be produced with a desired color or pattern, and with a desired flexibility or rigidity.

The backrest 94 and seat 96 (FIG. 9) can be designed as to have holes for ventilation on the hardened side 88 while the cloth side 84 remains intact.

Figure 10:
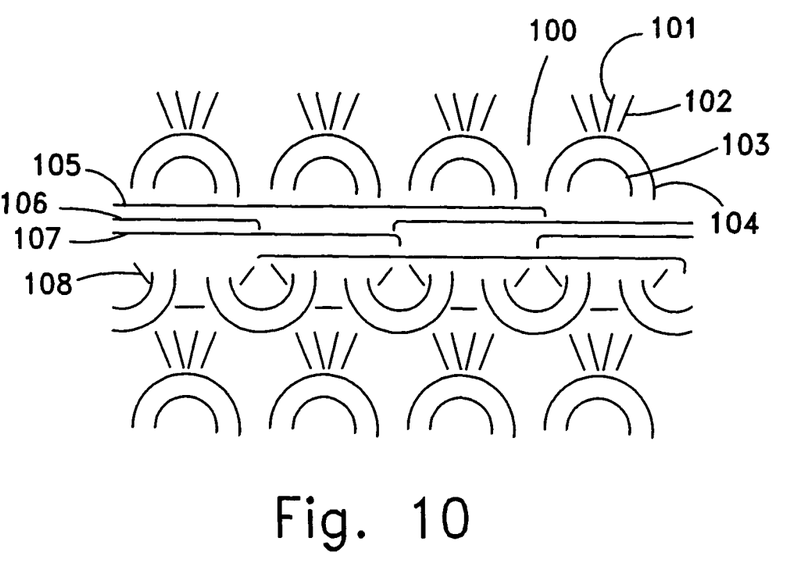
FIG. 10 schematically illustrates an example of a multi layer knitted fabric.

Turning now to FIG. 10, an example of a multi layer knitted fabric 100 is shown, in which yarns 101-104 knit the fabric base and yarns 105-108 are laid-in on the technical side of the knitted fabric. Yarns 101 and 103 are MFY and yarns 102 and 104 are NMFY. All laid-in yarns 105-108 are NMFY.

Figure 11:
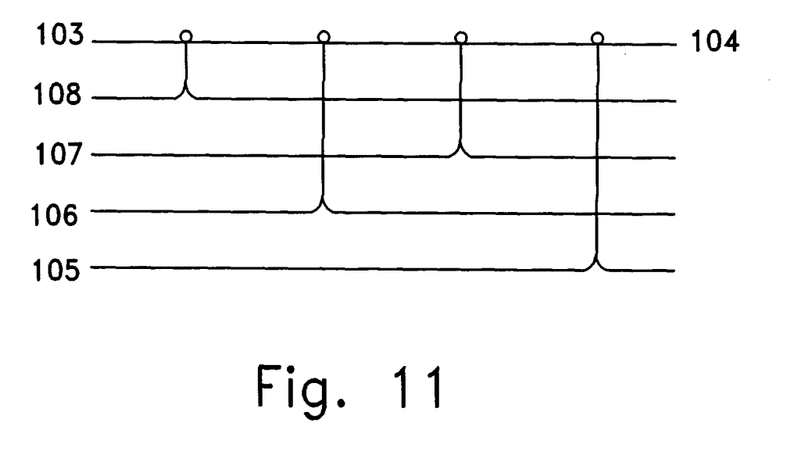
FIG. 11 is a technical illustration of the knitting pattern of the fabric of FIG. 10.

FIG. 11 is a technical illustration of the knitting pattern of the fabric of FIG. 10. The multi layer unitary fabric is created by yarns 103-104 which knit the base fabric while the laid-in yarns 105-108 are held by the respective loops created by yarns 103-104. During the heating and cooling process, a matrix with embedded yarns 104 is created on one side while the other side is a textile layer of yarns 105-108 that are held by the matrix and the embedded yarns.

It will be appreciated that many different composite fabric products may be produced according to the present invention, including vehicle interior components such as lining door panels and headliners, indoor furniture such as a table, outdoor furniture such as a plastic clothed chair, interior design products such as coverings for walls, ceilings, partitions and acoustic screens, cases, fashion accessories, and any other plastic-based element for which the look and feel of fabric is desired and structural properties can be conveniently tailored. The composite fabric product need not be a continuous product, and therefore may be provided with two spaced longitudinal ends. If so desired, the composite fabric product may be produced without arc portions, so that the two longitudinal ends may be angularly spaced by an acute or a 90-degree angle.

It will be appreciated that many different composite fabric products incorporating NMFY such as Glass, Kevlar or Aramid and others, embedded in the melted plastic, may be used in applications requiring particular mechanical strength.

A composite fabric product of the present invention has a surprisingly high compressive and tensile load bearing capacity, which is sufficiently high to support a person lying thereon when the composite fabric product is embodied by a lounge chair. Such a high load bearing capacity is achieved by producing a multi-layered woven fabric having a relatively high area weight and thread density and by causing the MFY to melt and to be fused with the reinforcement threads.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A process for manufacturing a thermoformed, two or three dimensional composite fabric product with a single web, comprising the steps of:
   (a) weaving warp and weft threads of at least one thermoplastic layer comprising thermoplastic textile material melting fibers or yarns (MFY) which are meltable at a melting temperature of said MFY and at least one type of non-melting fibers or yarns (NMFY) which are not meltable at said melting temperature, while simultaneously
      (i) weaving warp and weft threads of at least one outer layer of textile material made entirely of NMFY and
      (ii) interlacing NMFY textile material from said at least one outer layer, at least at one location, with MFY textile material from said at least one thermoplastic layer;
   (b) heating said at least one thermoplastic layer to a temperature less than or equal to said melting temperature which is sufficient for causing the MFY textile material to at least partially melt; and
   (c) allowing the fabric to cool, thereby to create a solid matrix layer which contains MFY textile material interlaced with reinforcing NMFY textile material originating from the outer textile layer.

2. The process according to claim 1, further comprising the step of working the interlaced material of step (c) in mold elements that have a gap, and controlling heating and cooling of said material separately.

3. The process according to claim 1, wherein a trailing longitudinal end of the fabric is made to overlap and is brought into contact with a leading longitudinal end thereof, prior to performing the heating step.

4. The process according to claim 1, for joining sheets for wider or longer applications wherein a right transversal side of the fabric is made to overlap and is brought into contact with a left transversal side thereof, prior to performing the heating step.

5. The process according to claim 1, further comprising incorporating electricity and communication lines in the at least one thermoplastic layer prior to the heating step.

6. The process according to claim 1, further comprising incorporating accessories such as hinges in the at least one thermoplastic layer prior to the heating step.

7. The process according to claim 1, wherein the interlacing thermoplastic textile material is woven as warp and/or weft and the non-melting interlacing material is woven as warp and/or weft.

8. The process according to claim 1, further comprising the steps of:
   (a) providing an intermediate textile layer between the at least one outer layer and the at least one thermoplastic layer to isolate the solid matrix layer from the textile material of the at least one outer layer;
   (b) interlacing the NMFY textile material from a first adjacent layer to the MFY textile material from a second adjacent layer; and
   (c) performing the heating and cooling steps,
   wherein all layers of the composite fabric product are woven and interlaced simultaneously.

9. The process according to claim 1, wherein the NMFY textile material is selected from the group consisting of polyamide fibers, glass fibers, Kevlar fibers, aramid fibers, carbon fibers, natural fibers, metal fibers, electricity lines and communication lines.

10. The process according to claim 1, wherein the MFY textile material is selected from the group consisting of polyester fibers, acrylic fibers, glass fibers and polypropylene fibers.

11. The process according to claim 1, wherein the composite fabric product is produced with a three-dimensional spatial shape.

12. The process according to claim 11, wherein the three-dimensional spatial shape is selected from the group consisting of curvilinear, rectilinear and a closed loop shape.

13. The process according to claim 1, wherein the composite fabric product is selected from the group consisting of chairs, lounge chairs, wall coverings, ceilings, partitions, acoustical screens, cases, fashion accessories and structural accessories.

14. The process according to claim 1, wherein one region of the composite fabric product is produced with a different number of layers than a second region thereof to control physical properties of the composite fabric product.

* * * * *